United States Patent [19]

McFarlane et al.

[11] Patent Number: 5,253,569
[45] Date of Patent: Oct. 19, 1993

[54] SERPENTINE FOOD PROCESSING WITH CLOSED-LOOP RECIRCULATION

[75] Inventors: Claude L. McFarlane, Madison; Daniel J. Cody, Prairie du Sac; George R. Millard, Jr., Poynette, all of Wis.

[73] Assignee: DEC International, Inc., Madison, Wis.

[21] Appl. No.: 754,539

[22] Filed: Nov. 4, 1991

Related U.S. Application Data

[63] Continuation-in-part of Ser. No. 517,251, May 1, 1990, abandoned.

[51] Int. Cl.⁵ .............................. A23B 4/03
[52] U.S. Cl. .................... 99/476; 99/478; 34/216
[58] Field of Search .............. 99/443 C, 474, 476–478; 34/203, 207, 210, 216; 432/8, 59; 126/21 A; 219/388, 400

[56] References Cited

U.S. PATENT DOCUMENTS

| | | |
|---|---|---|
| 1,068,272 | 7/1913 | Rayson . |
| 1,374,709 | 4/1921 | Allsop et al. ............ 34/207 |
| 1,483,668 | 2/1924 | Little . |
| 2,136,124 | 11/1938 | Berger ..................... 99/477 |
| 2,365,769 | 12/1944 | Marshall . |
| 2,596,381 | 5/1952 | Doty ........................ 99/477 |
| 2,783,545 | 3/1957 | Booth ...................... 34/207 |
| 2,870,024 | 1/1959 | Martin . |
| 3,089,254 | 5/1963 | Johnson et al. .......... 34/216 |
| 3,295,434 | 1/1967 | Wilhelm et al. . |
| 4,138,860 | 2/1979 | Drummond . |
| 4,277,954 | 7/1981 | Drummond . |
| 4,329,850 | 5/1982 | Drummond . |
| 4,426,923 | 1/1984 | Ohata . |
| 4,590,916 | 5/1986 | Konig . |
| 4,784,053 | 11/1988 | Barnhart . |

FOREIGN PATENT DOCUMENTS

| | | | |
|---|---|---|---|
| 134100 | 10/1919 | United Kingdom ........... 34/203 |
| 762677 | 12/1956 | United Kingdom ........... 34/207 |
| 910177 | 11/1962 | United Kingdom ........... 34/207 |

Primary Examiner—Harvey C. Hornsby
Assistant Examiner—Mark Spisich
Attorney, Agent, or Firm—Andrus, Sceales, Starke & Sawall

[57] ABSTRACT

A food processing system (100) includes a food processing chamber (102) for processing a food product, a serpentine conveyor (104) having a plurality of parallel flights connected at their ends by U-shaped bends, and a recirculation system for supplying a processing medium to the chamber and recirculating the processing medium along a closed-loop unidirectional recirculation path having a supply path portion (106) along and parallel to a first set of flights (108), and a return path portion (110) along and parallel to a second set of flights (112). A blower (114) has a high pressure supply side (116) supplying the processing medium to the supply path portion, and a low pressure return side (118) drawing the processing medium from the return path portion. The processing medium acts on the food product in both the supply and return path portions, and the food product on the flights travels both with and against the direction of flow of the processing medium during each of the supply and return path portions without reversing the direction of flow of the processing medium along the closed-loop recirculation path.

8 Claims, 5 Drawing Sheets

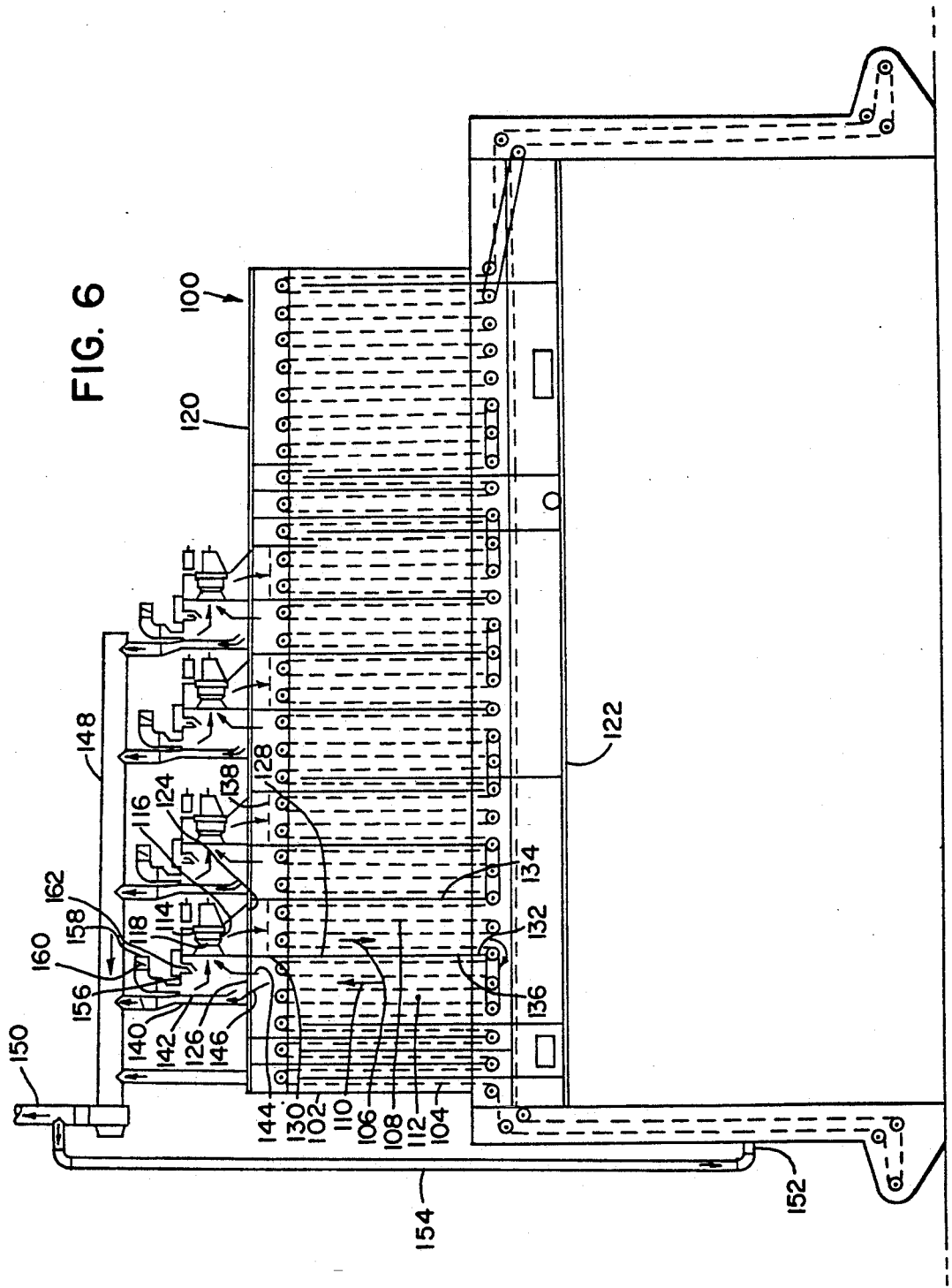

SERPENTINE FOOD PROCESSING WITH CLOSED-LOOP RECIRCULATION

CROSS-REFERENCE TO RELATED APPLICATION

This application is a continuation in part of application Ser. No. 07/517,251, filed May 1, 1990, abandoned.

BACKGROUND AND SUMMARY

This invention relates to a serpentine food processor and method such as for use in processing meat products, and more particularly to circulation of air or other processing medium within the food processor.

Various serpentine food processors are known in the art, such as shown in U.S. Pat. Nos. 4,784,053, 4,329,850, 4,277,954, 4,138,860, the disclosures of which are hereby incorporated by reference.

A serpentine food processor typically employs a continuous serpentine chain conveyor for transporting the food product through a processing chamber. The chamber has a predetermined temperature and environment for processing the food product, such as for cooking or chilling the product. The serpentine path provides a plurality of parallel flights connected at their ends by U-shaped bends. Each piece of food product carried by the serpentine conveyor is exposed to the same conditions of cooking or chilling as the piece of product ahead of or behind it. This provides a high degree of product uniformity, which results in high yields and extended shelf life of the product.

In the processing chamber, cooking heat may be provided by steam, hot water, hot air or the like, and chilling may be provided by a tap water shower, recirculated brine or glycol, cooled air or the like.

Prior art serpentine systems employ ducts on either side of the processing chamber or compartment which are supplied with heat or cooled air or other processing medium, which is discharged downwardly through nozzles in communication with the ducts for introducing the processing medium into the interior of the compartment. The nozzles are located on either side of the compartment, so as to force the processing medium downwardly to the bottom of the compartment, after which the medium passes through the compartment so as to expose the product thereto. The processing medium is then exhausted through a flue mounted to the top of the compartment.

In the type of system described, the internal width of the chamber compartment must be sufficient to accommodate the discharge nozzles and to provide a flow path for downward flow of the medium to the bottom of the compartment, whereafter the medium diffuses upwardly through the product prior to being exhausted. Additionally, the overall exterior width of the processing system includes the duct work. This provides an overall package which is quite wide, and which can be installed only in an area having sufficient room to accommodate such width.

Further, it has been found that the circulation of air or other processing medium downwardly along the sides of the compartment and upwardly through the product can result in nonuniformity of the product across the width of the product carriers.

The invention of the above noted parent application has as its object to address the concerns noted above by providing a serpentine food processor having a decreased width and which also provides improved circulation of the processing medium through the compartment and over the product therein, resulting in an increase in product uniformity.

In accordance with the parent invention, a food processing system comprises a processing chamber or compartment and a continuous conveyor for transporting the food product through the compartment along a serpentine path. The system further includes means for supplying a processing medium to the compartment and for providing movement of the processing medium through the compartment in a one-way vertical path throughout the entire width of the compartment for the full height of the serpentine path. In one embodiment, the processing medium supply means comprises a supply outlet located above the uppermost point of the serpentine path for outletting the processing medium above the conveyor, and collection means located below the lowermost point of the serpentine path for collecting the processing medium after it passes through the serpentine path. This arrangement provides top-to-bottom vertical one-way flow of the processing medium through the serpentine path. The processing medium supply outlet preferably comprises a supply plenum located in the uppermost portion of the compartment, with the supply plenum receiving the processing medium under pressure from a supply duct having an outlet in communication with the interior of the supply plenum.

In accordance with another aspect of the parent invention, recirculation means is provided for recirculating the processing medium after discharge thereof from the processing compartment. In the embodiment providing top-to-bottom flow of the processing medium through the serpentine path, the recirculation means comprises a blower having its intake in communication with the collection means and having its outlet in communication with the processing medium supply outlet. When the processing medium is heated, a burner or the like is provided for reheating the processing medium before it is resupplied to the processing compartment.

In the present invention, the processing medium is provided to the chamber and is recirculated along a closed-loop unidirectional recirculation path having a supply path portion along and parallel to a first set of flights of the serpentine conveyor path, and a return path portion along and parallel to a second set of flights. A blower has a high pressure supply side supplying the processing medium to the supply path portion, and a low pressure return side drawing the processing medium from the return path portion. The processing medium acts on the food product in both the supply and return path portions, and the food product on the flights travels both with and against the direction of flow of the processing medium during each of the supply and return path portions without reversing the direction of flow of the processing medium along the closed-loop recirculation path.

BRIEF DESCRIPTION OF THE DRAWINGS

FIG. 6 is a longitudinal cross-sectional view of a processing system in accordance with the present invention.

DETAILED DESCRIPTION OF THE PREFERRED EMBODIMENT

Figure 1:
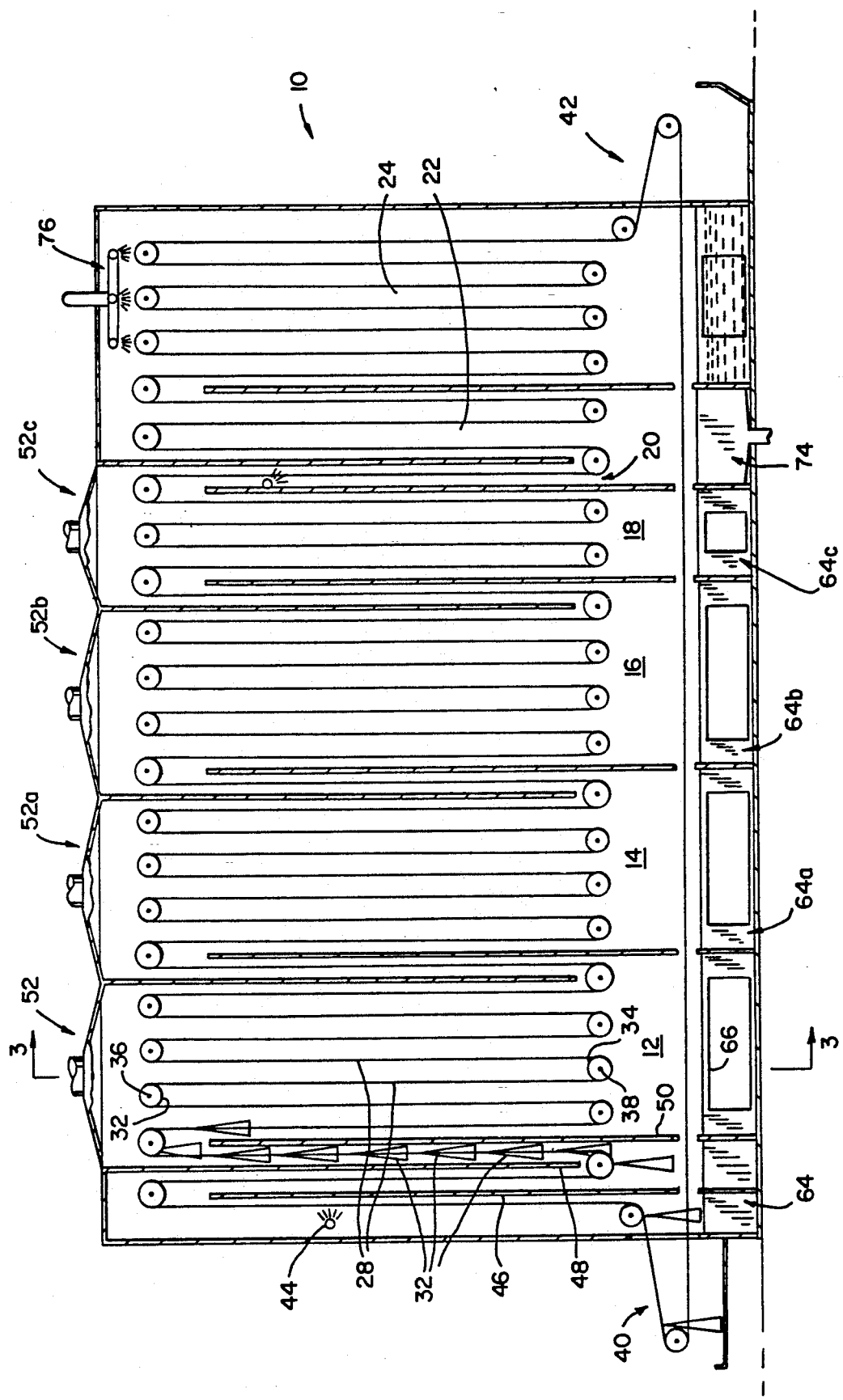
FIG. 1 is a longitudinal cross-sectional view of a processing system constructed according to the parent invention, showing four-zone heating of the product.

FIG. 1 shows a food processor 10 including an internal processing chamber defined by heating compartments 12, 14, 16 and 18; a fresh water rinse area 20; a water drip-off area 22, and a brine chill zone 24. As is known, heating compartments 12-18 provide an elevated temperature and environment for cooking product passing therethrough. Rinse area 20 and drip-off area 22 clean the product and lower its temperature, and the product temperature is further lowered in brine chill zone 24. A warm water rinse area 26 is provided upstream of heating compartment 12.

A continuous conveyor including chains 28 and 30 (FIGS. 1 and 3), transports food product through the chamber of processor 10 by a plurality of product carriers, shown at 32, mounted to and between chains 28 and 30. Chains 28 and 30 transport the food product through the chamber along a serpentine path having a plurality of generally vertical flights between upper and lower sprockets, such as shown at 32 and 34, mounted on upper and lower sets of loop shafts, such as shown at 36, 38, respectively. The flights defined by chains 28, 30 may be in a straight up and down orientation, or at a slight angle relative to the vertical, all of which are considered generally vertical. A conventional drive system is provided for imparting movement to chains 28, 30 and for moving product carried by carriers 32 through the processing chamber.

A loading area 40 is provided at one end of food processor 10, at which an operator loads product carriers 32 containing product onto the serpentine conveyor. At the other end of food processor 10, an unload area 42 is provided at which product carriers 32 are unloaded from the serpentine conveyor.

At warm water rinse area 26, a nozzle 44 sprays warm water onto the product carried by carriers 32 to elevate the product temperature prior to entry of the product into heating chamber 12, for relieving shock to the product which may otherwise result. Product carriers 32 pass over a wall 46 defining the right hand side of warm water rinse area 26, and under a wall 48 which separates warm water rinse area 44 from heating chamber 12. Product carriers 32 then pass over a wall 50 defining the left hand side of heating compartment 12, and in an up and down manner through heating compartment 12 as is known.

Figure 3:
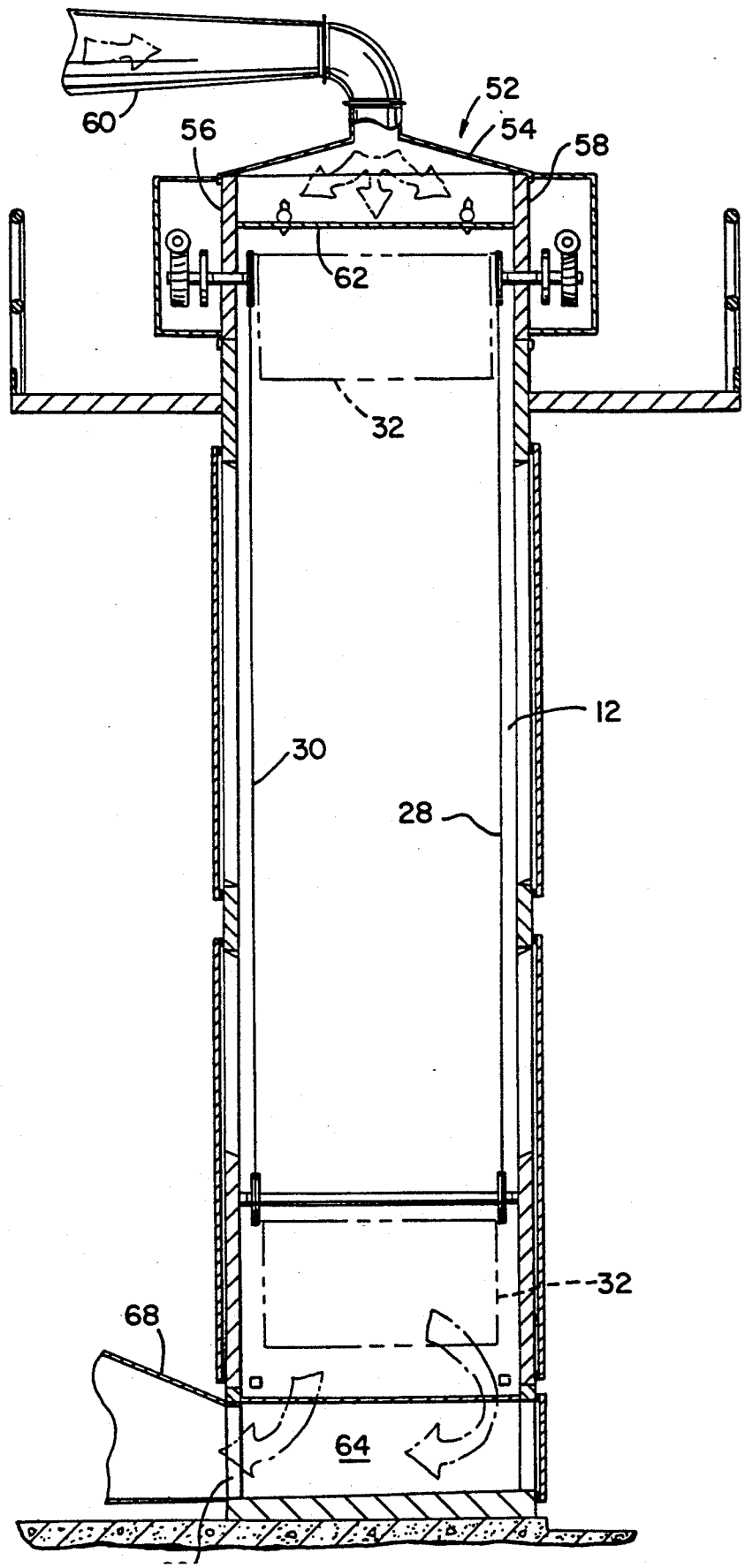
FIG. 3 is a partial transverse cross-sectional view taken generally along line 3—3 of FIG. 1.

With reference to FIGS. 1 and 3, an air supply plenum 52 is mounted to the upper portion of heating compartment 12. Plenum 52 includes an upper wall 54 spanning between a pair of panels 56, 58 defining the upper side portions of heating compartment 12, with plenum upper wall 54 having a substantially central opening in communication with the outlet of a duct 60. Heated air, steam or the like is supplied through duct 60 into the interior of plenum 52 by conventional means for providing a heated processing medium.

An outlet plate 62 defines the lower wall of supply plenum 52, and includes a series of openings therethrough for allowing communication between the interior of supply duct 52 and heating compartment 12. Outlet plate 62 maintains a back pressure within the interior of supply plenum 52, providing turbulence to pressurized air supplied thereto to provide an even distribution of pressurized air throughout the width of supply plenum 52. The heated pressurized air is discharged through the openings in outlet plate 62 downwardly into the interior of heating compartment 12, onto the product carried by product carriers 32 therethrough. The flow of heated air through heating compartment 12 is in a substantially vertical downward direction throughout the entire width of compartment 12 and the full height of the serpentine path of the conveyor in heating compartment 12. With this arrangement, a high degree of processing uniformity is achieved across the width of the heating compartment.

After passage of the heated air downwardly through the full height of the serpentine conveyor path, the air is collected in a collection manifold 64 provided at the bottom of heating compartment 12. Manifold 64 collects the heated air, when is then forced outwardly from manifold 64 through an opening 66 in a sidewall thereof and into a recirculation duct 68.

In a manner similar to that described with reference to compartment 12, compartments 14, 16 and 18 are provided with heated air plenums 52a, 52b and 52c respectively, at their upper ends, and with collection manifolds 64a, 64b and 64c at their lower ends.

Figure 2:
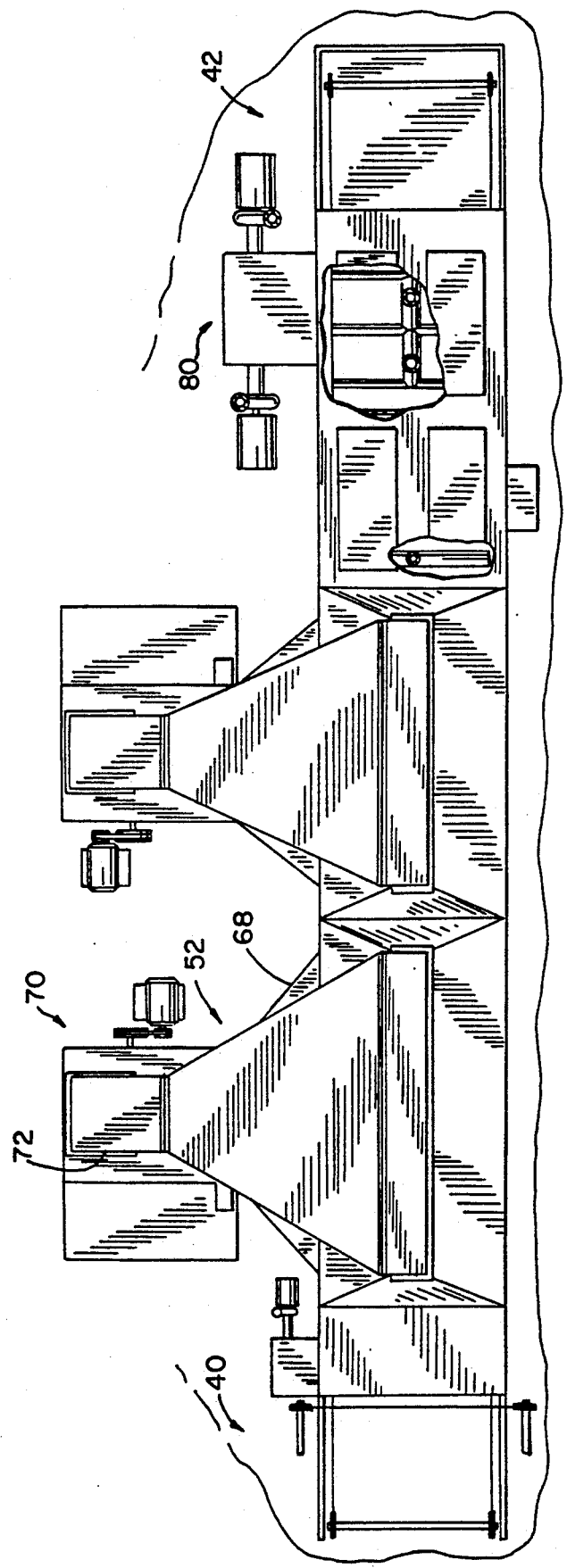
FIG. 2 is a top plan view of a food processing system similar to that shown in FIG. 1, but showing two-zone heating of the product.

Referring to FIG. 2, which illustrates a two-compartment system similar in all respects to the four-compartment system shown in FIG. 1 except for the elimination of two of the heating compartments, recirculation duct 68 has an outlet in communication with the intake of a blower 70 which, as illustrated, is mounted to the floor of the room in which food processor 10 is contained. Blower 70 provides positive pressure to air supplied therethrough from its intake. The pressurized air is supplied to a vertical duct 72, which communicates with duct 60 (FIG. 3) to supply pressurized air to plenum 52. A burner, heating coil or the like is provided in duct 72 for elevating the temperature of air within duct 72 to a predetermined temperature in preparation for passage of the air through heating compartment 12.

Each of heating compartments 14, 16 and 18 is constructed similarly to heating compartment 12, providing top-to-bottom flow of heated air throughout the width of the compartment and the full height of the serpentine conveyor path located therein, and also providing recirculation of the heating air.

A drain 74 is provided below fresh water rinse area 20 and water drip-off area 22, for collecting excess water.

In brine chill zone 24, a brine spray system 76 is provided in the upper area of zone 24, and a reservoir 78 is provided in the lower portion of zone 24. Referring again to FIG. 2, a pump 80 having its intake in communication with reservoir 78 elevates the brine to spray system 76 to recirculate the brine. Cooling coils or other such satisfactory apparatus are provided for rechilling the brine prior to recirculation.

Figure 4:
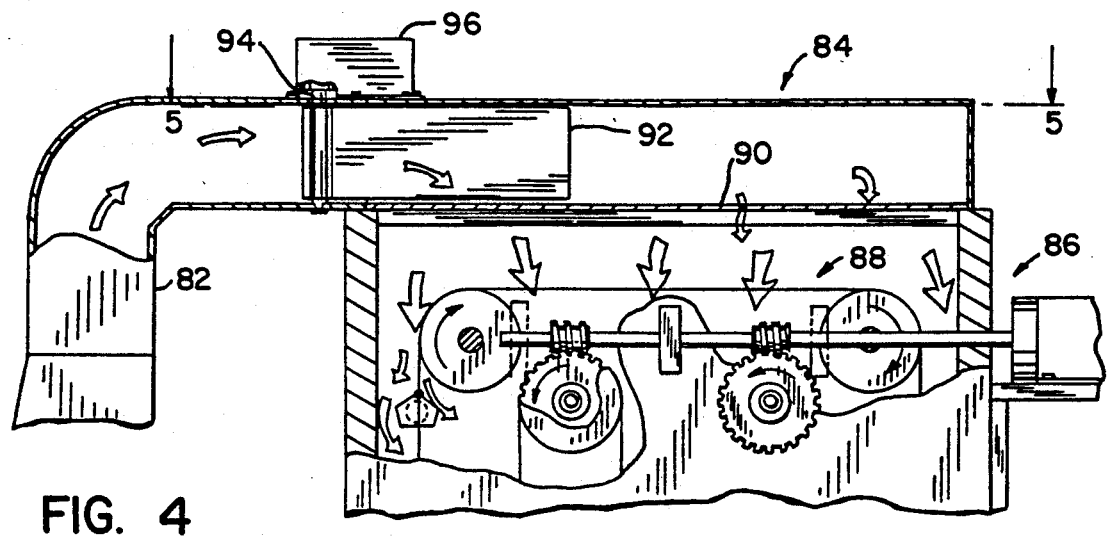
FIG. 4 is a partial longitudinal cross-sectional view of an alternate embodiment of the parent invention, showing an oscillating diverter associated with the supply plenum.

FIG. 4 illustrates an alternate embodiment of the invention. In this embodiment, a recirculation duct 82 provides heated air to a supply plenum 84, which is mounted to the upper portion of a processing compartment 86 in which is located a serpentine conveyor system, shown generally at 88. Plenum 84 includes a perforated outlet plate 90, which provides communication between the interior of plenum 84 and the interior of compartment 86.

A diverter plate 92 is mounted at one end t a shaft 94, which extends upwardly through the upper wall of plenum 84. An oscillating motor 96, having an output member drivingly engaged with the upper end of shaft 94, is mounted to the upper surface of plenum 84 for oscillating diverter plate 94 in a back and forth motion within the interior of plenum 84.

Figure 5:
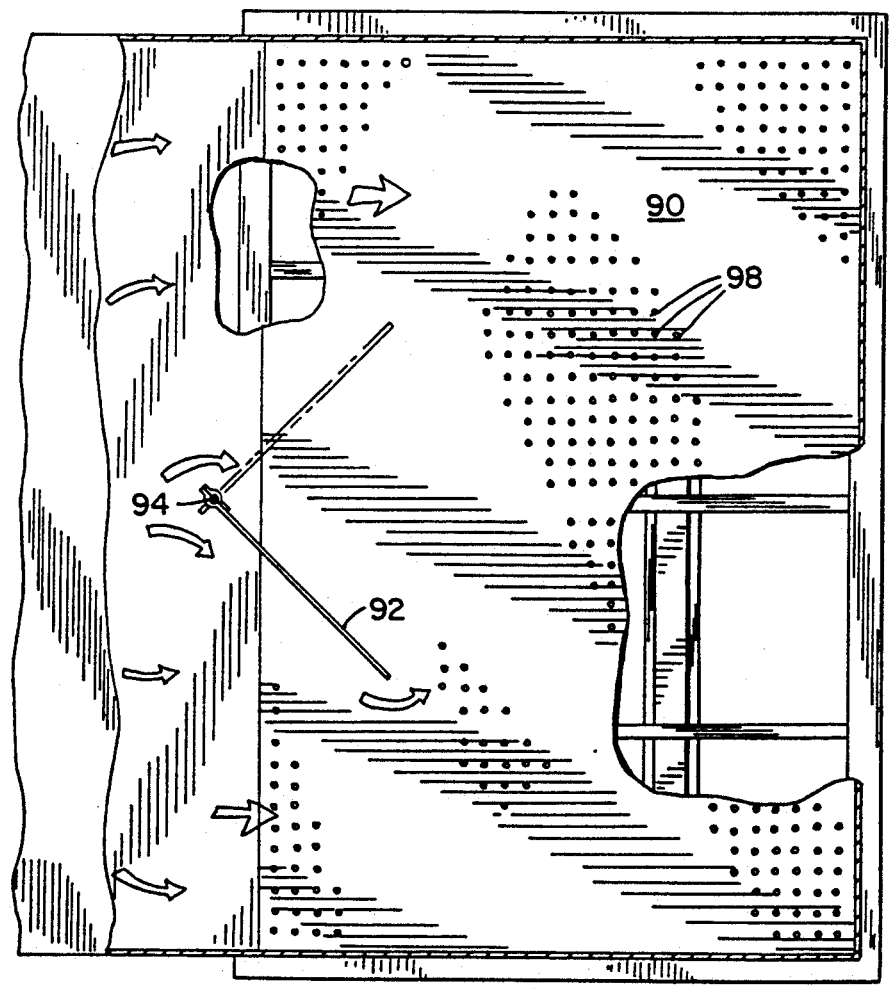
FIG. 5 is a partial sectional view taken generally along line 5—5 of FIG. 4.

Referring to FIG. 5, the back and forth oscillation of diverter plate 94 is between the position shown in solid lines and the position shown in phantom. This movement of diverter plate 94 within the interior of plenum 84 provides uniform distribution of heated air within plenum 84, and thereby uniformity of air passing downwardly through outlet plate 90 and the openings formed therein, shown at 98.

In FIG. 6, food processor 100 includes food processing chamber 102 for processing the food product, and serpentine conveyor 104 for transporting the food product along a serpentine path having a plurality of parallel flights connected at their ends by U-shaped bends. The processing medium is supplied to the chamber and recirculated along a closed-loop unidirectional recirculation path having a supply path portion 106 along and parallel to a first set of flights 108, and a return path portion 110 along and parallel to a second set of flights 112. Blower 114 has a high pressure supply side 116 supplying the processing medium to supply path portion 106, and a low pressure return side 118 drawing the processing medium from return path portion 110. The processing medium acts on the food product in both the supply and return path portions 106 and 110, and the food product on the flights 108 and 112 travels both with and against the direction of flow of the processing medium during each of the supply and return path portions 106 and 110 without reversing the direction of flow of the processing medium along the closed-loop recirculation path.

The chamber includes distally opposite top and bottom end walls 120 and 122 spaced oppositely from the top and bottom ends of the flights of the serpentine conveyor. High pressure supply side 116 of blower 114 and low pressure return side 118 of blower 114 each communicate through top end wall 120 at respective openings 124, 126 with the interior of chamber 102. The chamber includes a dividing wall 128 extending between and parallel to adjacent flights and separating the supply and return path portions 106 and 110. Dividing wall 128 has distally opposite top and bottom ends 130 and 132. Top end 130 of dividing wall 128 is at top end wall 120 of chamber 102. Dividing wall 128 has oppositely facing sides 134 and 136 extending between top and bottom ends 130 and 132. Side 134 of dividing wall 128 faces supply path portion 128. Side 136 of dividing wall 128 faces return path portion 110. The processing medium flows from high pressure supply side 116 of blower 114 through top end wall 120 of chamber 102 at opening 124 then through perforated plate 138, comparable to plate 90, then along supply path portion 106 along side 134 of dividing wall 128, then in a U-shaped bend around bottom end 132 of dividing wall 128, then along return path portion 110 along side 138 of dividing wall 128, then through top end wall 120 of chamber 102 at opening 126 to return to low pressure return side 118 of blower 114.

An exhaust outlet 140 communicates with return path portion 110 through top end wall 120 at opening 126. A passage divider 142 directs to low pressure return side 118 of blower 114 a first part 144 of the processing medium flow along return path 110 through end wall 120 at opening 126, and directs to exhaust outlet 140 a second part 146 of the processing medium flow along return path portion 110 through end wall 120 at opening 126. The first part 144 of the processing medium flow returns to blower 114 and is recirculated to supply path portion 106. The second part 146 of the processing medium flow is exhausted through outlet 140. The other processing compartments are comparable and have respective exhaust outlets connected to a common exhaust manifold 148 which is exhausted at exhaust pipe 150.

In one embodiment, the chamber has a pre-processing inlet 152 communicating with the food product on the serpentine conveyor at a location spaced upstream from the supply and return path portions 106 and 110. Food product passes adjacent pre-processing inlet 152 prior to reaching supply and return path portions 106 and 110. A duct 154 is connected between the exhaust outlet and the pre-processing inlet to communicate exhausted processing medium from the exhaust outlet through duct 154 to pre-processing inlet 152 to pre-process the food product.

In the preferred embodiment, a common plenum 156 services and communicates with low pressure return side 118 of blower 114 and exhaust outlet 140 and return path portion 110 through end wall 120 at opening 126. A fresh air inlet 158 having a movable control damper 160 communicates with plenum 156. A heater 162 communicates with plenum 156 and heats the air from fresh air inlet 158 and supplies heated fresh air to low pressure return side 118 of blower 114 in addition to the flow at 144 from return path portion 110 through opening 126 in end wall 120. In the preferred embodiment, eighty-five percent by volume of the air along return path portion 110 is recirculated at 144, and fifteen percent is exhausted at 146.

It is recognized that various equivalents, alternatives and modifications are possible within the scope of the appended claims.

We claim:

1. Food processing apparatus, comprising:
   a food processing chamber for processing a food product;
   a serpentine conveyor in said chamber for transporting said food product along a serpentine path having a plurality of parallel flights connected at their ends by U-shaped bends;
   means for supplying a processing medium to said chamber and for providing recirculation of said processing medium along a closed-loop recirculation path having a supply path portion along and parallel to a first set of said flights, and a return path portion along and parallel to a second set of said flights, comprising a blower having a high pressure supply side supplying said processing medium to said supply path portion, and having a low pressure return side drawing said processing medium from said return path portion, such that said processing medium acts on said food product in both said supply and return path portions and said food product on said flights travels both with and against the direction of flow of said processing medium during each of said supply and return path portions without reversing the direction of flow of said processing medium along said closed-loop recirculation path, wherein said chamber comprises first and second distally opposite end walls spaced oppositely from said ends of said flights at said U-shaped bends and extending perpendicularly to said flights, said high pressure supply side of said blower and said low pressure return side of said blower each communicating through said first end wall with the interior of said chamber, and such that the processing medium flows along the entire length of said first set of flights in said supply path portion and along the entire length of said second set of flights in said return path portion.

2. The invention according to claim 1 comprising a dividing wall in said chamber extending between and parallel to adjacent flights and separating said supply and return path portions.

3. The invention according to claim 2 wherein said dividing wall has first and second distally opposite ends, said first end of said dividing wall being at said first end wall of said chamber, said dividing wall has first and second oppositely facing sides extending between said ends of said dividing wall, said first side of said dividing wall facing said supply path portion, said second side of said dividing wall facing said return path portion, such that said processing medium flows from said high pressure supply side of said blower through said first end wall of said chamber then along said supply path portion along said first side of said dividing wall then flows in a U-shaped bend around said second end of said dividing wall then flows along said return path portion along said second side of said dividing wall then through said first end wall of said chamber to said low pressure return side of said blower.

4. The invention according to claim 3 comprising an exhaust outlet communicating with said return path portion through said first end wall of said chamber, and a passage divider directing to said low pressure return side of said blower a first part of the processing medium flow along said return path portion through said first end wall of said chamber, and directing to said exhaust outlet a second part of the processing medium flow along said return path portion through said first end wall of said chamber, such that said first part of said processing medium flow returns to said blower and is recirculated to said supply path portion, and said second part of said processing medium flow is exhausted.

5. The invention according to claim 4 comprising a common plenum communicating with said low pressure return side of said blower and said exhaust outlet and said return path portion through said first end wall of said chamber, a fresh air inlet communicating with said common plenum, and a heater communicating with said common plenum and heating the air from said fresh air inlet for supplying heated fresh air to said low pressure return side of said blower in addition to the flow from said return path portion through said first end wall of said chamber.

6. Food processing apparatus, comprising:
a food processing chamber for processing a food product;
a serpentine conveyor in said chamber for transporting said food product along a serpentine path having a plurality of parallel flights connected at their ends by U-shaped bends;
means for supplying a processing medium to said chamber and for providing recirculation of said processing medium along a closed-loop recirculation path having a supply path portion along and parallel to a first set of said flights, and a return path portion along and parallel to a second set of said flights, comprising a blower having a high pressure supply side supplying said processing medium to said supply path portion, and having a low pressure return side drawing said processing medium from said return path portion, such that said processing medium acts on said food product in both said supply and return path portions and said food product on said flights travels both with and against the direction of flow of said processing medium during each of said supply and return path portions without reversing the direction of flow of said processing medium along said closed-loop recirculation path, wherein said chamber comprises first and second distally opposite end walls spaced oppositely from said ends of said flights, said high pressure supply side of said blower and said low pressure return side of said blower each communicating through said first end wall with the interior of said chamber, and comprising a dividing wall in said chamber extending between and parallel to adjacent flights and separating said supply and return path portions, wherein said dividing wall has first and second distally opposite ends, said first end of said dividing wall being at said first end wall of said chamber, said dividing wall has first and second oppositely facing sides extending between said ends of said dividing wall, said first side of said dividing wall facing said supply path portion, said second side of said dividing wall facing said return path portion, such that said processing medium flows from said high pressure supply side of said blower through said first end wall of said chamber then along said supply path portion along said first side of said dividing wall then flows in a U-shaped bend around said second end of said dividing wall then flows along said return path portion along said second side of said dividing wall then through said first end wall of said chamber to said low pressure return side of said blower and comprising an exhaust outlet communicating with said return path portion through said first end wall of said chamber, and a passage divider directing to said low pressure return side of said blower a first part of the processing medium flow along said return path portion through said first end wall of said chamber, and directing to said exhaust outlet a second part of the processing medium flow along said return path portion through said first end wall of said chamber, such that said first part of said processing medium flow returns to said blower and is recirculated to said supply path portion, and said second part of said processing medium flow is exhausted, wherein said chamber has a pre-processing inlet communicating with said food product on said serpentine conveyor at a location spaced from said supply and return path portions such that said food product passes adjacent said pre-processing inlet prior to said supply and return path portions, and comprising a duct connected between said exhaust outlet and said pre-processing inlet to communicate exhausted processing medium from said exhaust outlet through said duct to said pre-processing inlet to pre-process said food product.

7. Food processing apparatus, comprising:

a food processing chamber for processing a food product;

a serpentine conveyor in said chamber for transporting said food product hanging therefrom along a serpentine path having a plurality of parallel vertically extending flights connected at their ends by upper and lower U-shaped bends;

means for supplying a processing medium to said chamber and for providing recirculation of said processing medium along a closed-loop recirculation path having a vertically extending supply path portion along and parallel to a first set of said flights, and a vertically extending return path portion along and parallel to a second set of flights, comprising a blower having a high pressure supply side supplying said processing medium to said supply path portion, and a low pressure return side drawing said processing medium from said return path portion, such that said processing medium acts on said food product in both said supply and return path portions and said food product on said flights travels vertically both with and against the vertical direction of flow of said processing medium during each of said supply and return path portions without reversing the direction of flow of said processing medium along said closed-loop recirculation path, wherein said chamber comprises top and bottom distally opposite horizontally extending end walls spaced oppositely above and below respective upper and lower U-shaped bends of said flights, said high pressure supply side of said blower and said low pressure return side of said blower each communicating through one of said end walls with the interior of said chamber, and comprising a vertically extending dividing wall in said chamber separating said supply and return path portions.

8. The invention according to claim 7 wherein said high pressure supply side and said low pressure return side of said blower communicate through said top end wall, said vertically extending dividing wall has an upper end engaging said top end wall of said chamber, and a lower end spaced above said bottom end wall of said chamber, said dividing wall has first and second oppositely facing sides extending vertically between said upper and lower ends of said dividing wall, said first side of said dividing wall facing said supply path portion, said second side of said dividing wall facing said return path portion, such that said processing medium flows from said high pressure supply side of said blower through said top end wall of said chamber then vertically downwardly along said supply path portion along said first side of said dividing wall then flows in a U-shaped bend around said lower end of said dividing wall then flows vertically upwardly along said return path portion along said second side of said dividing wall then through said top end wall of said chamber to said low pressure return side of said blower.

* * * * *

UNITED STATES PATENT AND TRADEMARK OFFICE
CERTIFICATE OF CORRECTION

PATENT NO. : 5,253,569

DATED : October 19, 1993

INVENTOR(S) : CLAUDE L. McFARLANE ET AL

It is certified that error appears in the above-identified patent and that said Letters Patent is hereby corrected as shown below:

On the title page, Item [22] Filing: delete "Nov. 4, 1991" and substitute therefor -- September 4, 1991 --.

Signed and Sealed this

Nineteenth Day of April, 1994

*Attest:*

BRUCE LEHMAN

*Attesting Officer*     *Commissioner of Patents and Trademarks*